Aug. 14, 1934.    S. E. HEDEN    1,969,929
FLUID PRESSURE CONTROLLED CIRCUIT MAKER
Filed Oct. 13, 1933
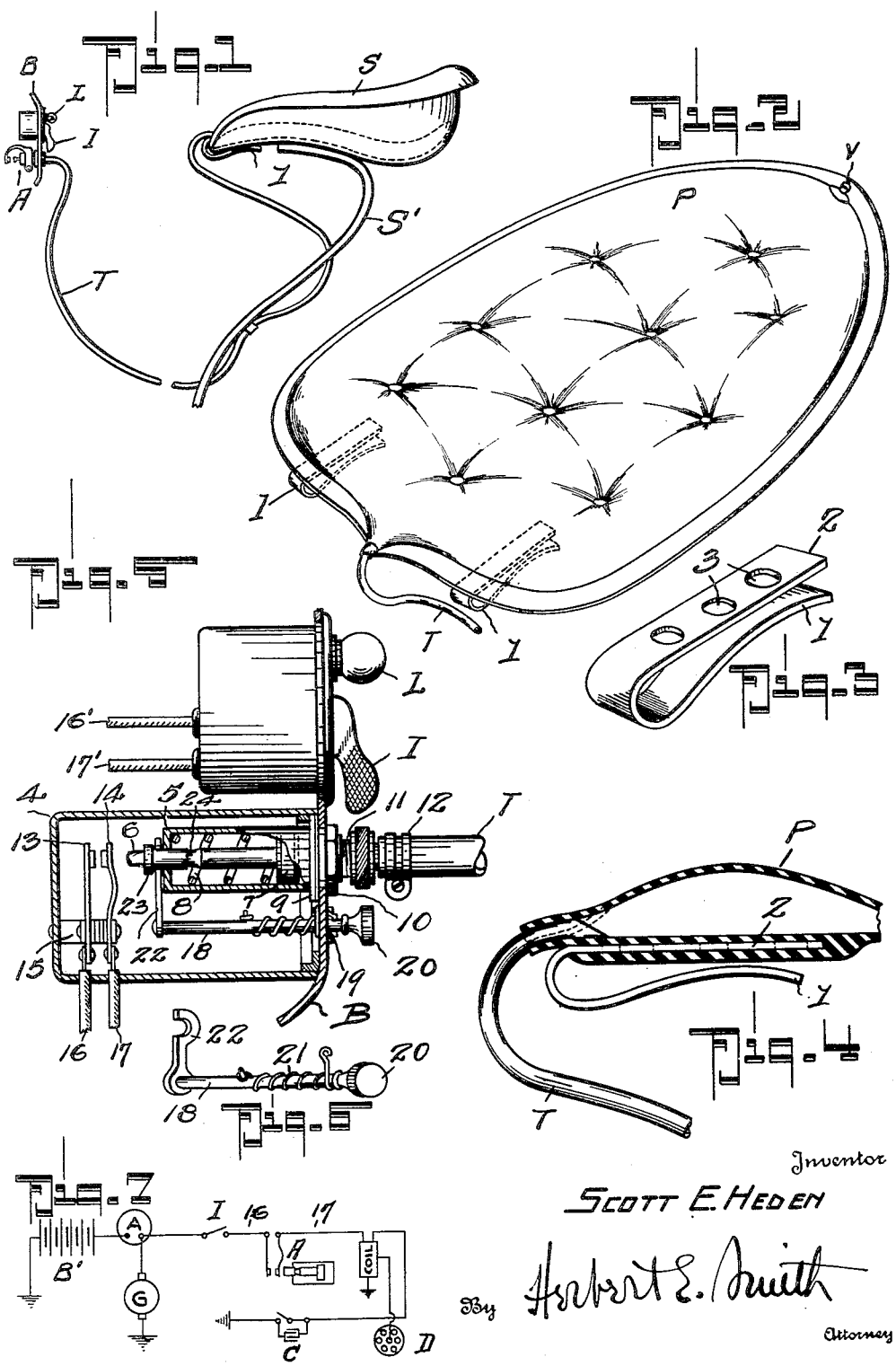
Inventor
SCOTT E. HEDEN
By Herbert E. Smith
Attorney Patented Aug. 14, 1934

1,969,929

UNITED STATES PATENT OFFICE 1,969,929

FLUID PRESSURE CONTROLLED CIRCUIT MAKER

Scott E. Heden, Mondovi, Wash.

Application October 13, 1933, Serial No. 693,508

4 Claims. (Cl. 180—82)

My present invention relates to a fluid pressure control for circuit makers, and specifically to a pneumatically operating mechanism employing a piston and cylinder for closing the circuit under air pressure, and holding the circuit maker closed by the weight of an automotive vehicle driver.

The mechanism of my invention is adaptable for use in various ways, but it is particularly valuable in connection with tractors of the internal combustion type having electrical ignition. Such tractors are employed to pull agricultural implements in the cultivation of the soil and under such conditions the tractor is located in advance of the implement and controlled by the driver who occupies a seat on the tractor. When the implement is doing side hill work or the implement is being towed by the tractor over rough ground, it frequently happens that the driver slides or tumbles from his seat to the ground, and is out of reach of the usual ignition switch. If the implement being towed is a wide gang of plows, disks, or harrows, the fallen driver may be in danger of life or limb from the oncoming, uncontrolled implement.

The primary object of my invention is to provide automatically operating mechanism which will stop the progress of the tractor and the implement, under these circumstances, and thereby avert danger to the driver. In carrying out my invention I employ a circuit maker in the ignition system of the tractor, in addition to the usual ignition switch, which circuit maker is closed by air pressure from a pneumatic pad located on the seat of the tractor and occupied by the driver. Under the weight of the driver and the air pressure, the circuit maker is closed, but in the absence of the weight of the driver from the seat-pad the circuit maker is automatically opened.

The invention consists in certain novel combinations and arrangements of parts as will hereinafter be more specifically pointed out and claimed. In the accompanying drawing I have illustrated one complete example of the physical embodiment of my invention wherein the parts are combined and arranged according to one mode I have thus far devised for the practical application of the principles of my invention. While I have referred to the specific use of the invention in connection with agricultural implements towed by tractors having electrical ignition control mechanism, it will be understood that the invention is applicable for use with other types of automotive vehicles employing an electrical ignition system, as well as for use with motors of vehicles having control systems other than electrical control. Therefore various changes and alterations may be made in the exemplified structures in adapting the invention for various purposes, which changes and alterations will be made within the scope of my claims without departing from the principles of the invention.

Figure 1 is a view in side elevation showing an implement or tractor-seat equipped with the pneumatic pad and air tube leading to the circuit maker.

Figure 2 is a perspective view of the pneumatic pad, and Figure 3 is a perspective view of one of the pad-clips by means of which the pad is detachably fastened to the tractor-seat.

Figure 4 is a sectional detail view of part of the pad showing the manner of securing the fastening clips in the bottom wall of the pad.

Figure 5 is an enlarged sectional detail view of the circuit maker, showing also a pilot or signal lamp and the usual ignition switch-lever on the instrument panel of the automotive vehicle.

Figure 6 is a perspective view of the rotary spring-latch for holding the circuit maker closed under some conditions.

Figure 7 is a diagram of the wiring for the ignition system of an internal combustion engine as employed on a tractor, and showing the inclusion in this system of the circuit maker, according to my invention.

The seat S, and its spring support S' are of the usual type employed for the driver and supported in appropriate location on the tractor, and I utilize a well known type of pneumatic seat-pad P, having an inflating valve V, which pad is placed in the seat as indicated by dotted lines in Figure 1. The rubber seat-pad may be inflated to the normal air pressure by blowing, or otherwise supplying air under pressure through the valve V.

The seat-pad is provided with an air tube T which is connected to the circuit maker, indicated as a whole by the letter A, and the pad is detachably fastened to the seat by means of spring clips, as 1, 1, slipped over the front edge of the seat S. These clips are fashioned with flat shanks 2 which are perforated at 3 and the perforated shanks are imbedded in the rubber of the bottom wall of the pad by the usual molding process.

The circuit maker A is supported on the instrument panel B of the tractor, and the operating parts of the device are enclosed within a housing as 4 attached in suitable manner to the back face of the panel. Within the housing is located a cylinder 5 and a piston or plunger 6 is supported at the longitudinal center of the cylinder to reciprocate therein. One end of the plunger projects through an end of the housing and the other end of the plunger is provided with a piston-head 7 within the housing. The piston or plunger and the head are moved, under air pressure to close the circuit maker, and a spring 8 in the cylinder is interposed between the head and one end of the cylinder for retracting the plunger, and thereby permit the circuit maker to automatically open, and break the ignition circuit.

The front end of the cylinder is provided with an attaching flange 9 and an attaching nut 10 at opposite sides of the panel B, and a nipple 11 at the front end of the cylinder projects through the panel, and is provided with an annular clamp 12 by means of which the air tube or pipe T is secured to the nipple. The tension of the spring 8 is greater than the normal, inflating-pressure of air in the seat-pad, and therefore, when the seat is unoccupied the circuit maker is open, but under the weight of the driver, when he occupies the seat, the air pressure in the pad and tube T is sufficient to overcome the tension of the spring and close the circuit by projecting the plunger to the left in Figure 5.

In the path of movement of the free end, or exterior end of the plunger is located the two blades 13 and 14 of the circuit maker, and these blades are supported on a bracket 15 within the cylinder. The blade 13 is the stationary blade, and the blade 14 adjoining the end of the plunger 6 is a spring blade which is flexed by the contact and pressure from the plunger to contact with the stationary blade and close the circuit. When the plunger is retracted, the spring blade 14 is released from its tension, and consequently the circuit is opened, automatically.

Wires 16 and 17 of the ignition circuit are indicated as connected with the blades of the circuit maker and at 16' and 17' they are connected to the switch I and lamp L in Figure 5. The ignition circuit of the diagram in Figure 7 includes the usual battery B', the ammeter A, generator G, coil, and distributer D, as well as the condenser C, and usual ignition switch I.

Under some conditions, it is desirable that the circuit maker shall be latched in closed position, and for this purpose I provide a spindle or rotary shaft 18, journaled to turn at 19 in the panel B, and provided with a hand-knob 20 at the front side of the panel. The spindle is disposed with its longitudinal axis parallel with the plunger 6, and a spring 21, coiled about the spindle, has one end attached to the spindle and its other end attached to the panel, for automatically retracting the latch-hook 22 mounted at the end of the spindle.

On the free end of the plunger, exterior of the cylinder, is provided a stop collar 23, and at a correct distance from the free end of the plunger, (within the cylinder when the circuit maker is open) is fashioned an annular groove forming a shoulder 24 on the plunger. With the plunger projected and the circuit maker closed, the knob 20 may be turned to swing the hook or latch 22 into the groove and against the shoulder 24. Then, in the absence of air pressure in the cylinder, the tension of the compressed spring 8 exerted against the head 7, holds the shoulder 24 against the latch hook 22, and the latter, by frictional contact, is prevented from disengagement from the plunger. When air pressure is again restored in the cylinder for holding the plunger projected, the spring 21 is permitted to swing the latch hook from the plunger.

In some instances the tractors are equipped with electric starters for the motor, and the driver occupies his seat S before he starts the tractor motor; while with tractors employing a hand-starter the driver of course cannot occupy the seat. In the latter instance, the driver first closes the ignition switch and the circuit maker and latches the latter in closed position. Then he starts the engine by cranking, manually, and when he again occupies the seat he releases the latch 18 leaving the circuit maker closed under pressure from the pneumatic pad. If the driver wishes to leave his seat with the ignition system closed, as when the tractor is stationary and the transmission mechanism is disconnected, but the engine running, he latches the circuit maker in closed position before he leaves his seat.

The automatic or pressure actuated circuit maker is thus adapted to be used in combination with the usual ignition switch in the ignition circuit, or the pressure actuated or controlled circuit maker is adapted to be used in lieu of the switch I.

The pressure controlled circuit maker thus becomes a safety appliance that insures the safety of the driver in the event that the tractor or the automotive vehicle becomes out of control of the driver, and the appliance operates automatically in the performance of its functions at the required time.

Having thus fully described my invention, what I claim as new and desire to secure by Letters Patent is:—

1. The combination with the ignition system of an automotive vehicle having a seat, of a pneumatic pad in the seat, an open circuit-maker, operating means for closing the circuit maker and means for automatically opening said circuit maker, and an air tube affording communication between the seat pad and said operating means whereby the circuit maker is closed by fluid pressure when the seat is occupied.

2. The combination with an automotive vehicle having a seat, an ignition switch and ignition system, and a signal lamp, of an open circuit maker and its circuit in the ignition system, operating means for closing the circuit maker and means for automatically opening said circuit maker, a pneumatic pad in the seat, and an air tube affording communication between the pad and said operating means, whereby the circuit maker is closed by fluid pressure when the seat is occupied.

3. The combination with the ignition system of an automotive vehicle, and a seat for the vehicle, of an open circuit maker and reciprocable operating means for closing said circuit maker, a pneumatic seat pad and detachable means for fastening said pad to the seat, an air tube affording communication between the pneumatic pad and said operating means whereby the circuit maker is closed by air pressure when the seat is occupied, and means for automatically retracting the operating means to permit opening of the circuit maker when the seat is unoccupied.

4. The combination with the ignition system of an automotive vehicle, an open circuit-maker in the ignition system, and a seat for the vehicle, of operating means for closing the circuit-maker, a pneumatic pad in the seat and means affording communication of air pressure between said pad and the operating means whereby the circuit maker is closed when the seat is occupied, means for automatically opening the circuit maker when the air pressure is withdrawn, and means co-acting with the operating means for locking the circuit maker in closed position.

SCOTT E. HEDEN.